United States Patent [19]
Max et al.

[11] Patent Number: 5,873,262
[45] Date of Patent: Feb. 23, 1999

[54] DESALINATION THROUGH METHANE HYDRATE

[75] Inventors: Michael D. Max, Washington, D.C.; Robert E. Pellenbarg, Silver Spring, Md.

[73] Assignee: The United States of America as represented by the Secretary of the Navy, Washington, D.C.

[21] Appl. No.: 886,574

[22] Filed: Jun. 30, 1997

[51] Int. Cl.⁶ ................................................ B01D 9/04
[52] U.S. Cl. ................................................ 62/532; 62/533
[58] Field of Search ........................ 62/532, 533

[56] References Cited

U.S. PATENT DOCUMENTS

| | | |
|---|---|---|
| 3,630,042 | 12/1971 | Petsinger .................................. 62/534 |
| 3,835,658 | 9/1974 | Wilson .................................. 62/534 X |
| 3,856,492 | 12/1974 | Klass .......................................... 62/532 |
| 3,892,103 | 7/1975 | Antonelli .................................. 62/532 |
| 4,593,538 | 6/1986 | Borde et al. .............................. 62/490 |
| 5,553,456 | 9/1996 | McCormack . |

*Primary Examiner*—Christopher B. Kilner
*Attorney, Agent, or Firm*—Thomas E. McDonnell; George A. Kap

[57] ABSTRACT

In one embodiment, this invention pertains to desalination of seawater by feeding methane into seawater at a depth exceeding 100 meters to form methane hydrate which rises to where it is decomposed into methane and water, and recovering water. Methane is recycled.

20 Claims, 2 Drawing Sheets

DESALINATION THROUGH METHANE HYDRATE

BACKGROUND OF INVENTION

1. Field of Invention

This invention pertains to desalination of seawater by formation of methane hydrate at appropriate temperature and pressure conditions and subsequent formation of potable water therefrom.

2. Description of Prior Art

Original methods proposed for desalinating seawater involved distillation where seawater is heated to the boiling point and water vapor is then condensed to form fresh water. Distillation includes the use of sunlight to evaporate water and then collecting the condensate to form fresh or potable water.

Desalination by distillation was followed by the use of reverse osmosis which involves diffusion of fresh water from seawater through a semipermeable membrane due to the high pressure applied to the seawater feed tank. Desalination by reverse osmosis is considered more expensive than desalination by distillation primarily due to the cost of the semipermeable membranes and the high pressure pumps required.

Presently, desalination of seawater is effected by freezing. In indirect freezing, freezing is accomplished by circulating a cold refrigerant through a heat exchanger to remove heat from the seawater. Ice is formed on the heat exchanger surface and is removed, washed and melted to produce fresh water. In the category of freeze desalination by direct freezing, where desalination is carried out by the vacuum freezing vapor compression process, heat is removed from seawater by direct contact with a refrigerant. In a secondary refrigerant mode of this process, a refrigerant that has low solubility in water is compressed, cooled to a temperature close to the freezing temperature of salt water and mixed with seawater. As the refrigerant evaporates, heat is absorbed from the mixture and water freezes into ice.

Various alternative proposals for freezing desalination are described in paper entitled "Desalination by Freezing" by Herbert Wiegandt, School of Chemical Engineering, Cornell University, March 1990.

In gas hydrate or clathrate freeze desalination, a gas hydrate spontaneously is formed of an aggregation of water molecules around a hydrocarbon at temperatures higher than the freezing temperature of water. When gas hydrate is melted, fresh water and the hydrocarbon are recovered, thus simultaneously, producing fresh water and the hydrocarbon which can be recirculated. This has the advantage over other direct freezing processes in that the operating temperature is higher, thus reducing power requirements when forming and when melting the gas hydrates.

U.S. Pat. No. 5,553,456 to McCormack, discloses a clathrate freezing desalination system and method in which a clathrate forming agent is injected through a submerged pipeline to a predetermined ocean depth at which the surrounding ocean temperature is less than the clathrate forming temperature. The agent combines with the salt water to form a slurry of clathrate ice crystals and brine. The pipeline is concentric and coaxial with a surrounding outer pipeline in which the slurry is formed. The slurry is pumped back to the surface through the outer pipeline and the ice crystals are washed to remove brine. The washed crystals are then melted and the resultant water is seperated from the clathrate forming agent, which may be discarded or recycled for re-injection through the inner pipeline. The melting of the clathrate ice as well as the cold water and air circulating in the desalination plant can be utilized as a source of air conditioning for local buildings and facilities.

The clathrate forming agents disclosed by the U.S. Pat. No. 5,553,456 include carbon dioxide, halogenated methanes and ethanes, and cyclopropane. A clathrate is a generic term for an inclusion compound composed of water and other molecules of smaller size. Methane hydrate is a specific clathrate.

OBJECTS AND SUMMARY OF INVENTION

It is an object of this invention to desalinate seawater by the use of methane hydrate.

It is another object of this invention to form methane hydrate in seawater instantaneously in the hydrate stability zone.

It is another object of this invention to purify polluted water.

These and other objects of this invention are accomplished by a method of desalinating seawater by feeding methane gas into a lower zone of a body of saline or polluted water of sufficient temperature and pressure to spontaneously form methane hydrate which rises under its own buyoncy after its formation to a higher zone where it decomposes into methane and desalinated water, and recovering the desalinated water. Recovered methane is recycled to the deep end of the pipeline.

DESCRIPTION OF PREFERRED EMBODIMENTS

This process can be used to separate water from heavier or lighter pollutants relative to water. In the case of heavier pollutants, such as brine or salt, described as desalination, water collects at top of a column above brine since water is lighter than brine. In the case of separating water from lighter pollutants, such as oil, such pollutants collect above water and are selectively removed at a point above water.

The desalination process of this invention is now described by reference to the diagram of the apparatus shown in FIG. 1(a). Column 20 is closed at top 22, open at bottom 34 and is defined by wall 26 on the outer periphery. Column 20 is typically a pipe that is closed at the top and open at the bottom. The column is typically positioned vertically in a body of seawater deep enough so that the seawater at the lower portion of the column is sufficiently cold and under sufficient pressure to form methane hydrates. Although it is possible to artificially control temperature and pressure, however, sufficient temperature and pressure typically prevail in a normal ocean profile to naturally form methane hydrates at ocean depths.

Figure 2:
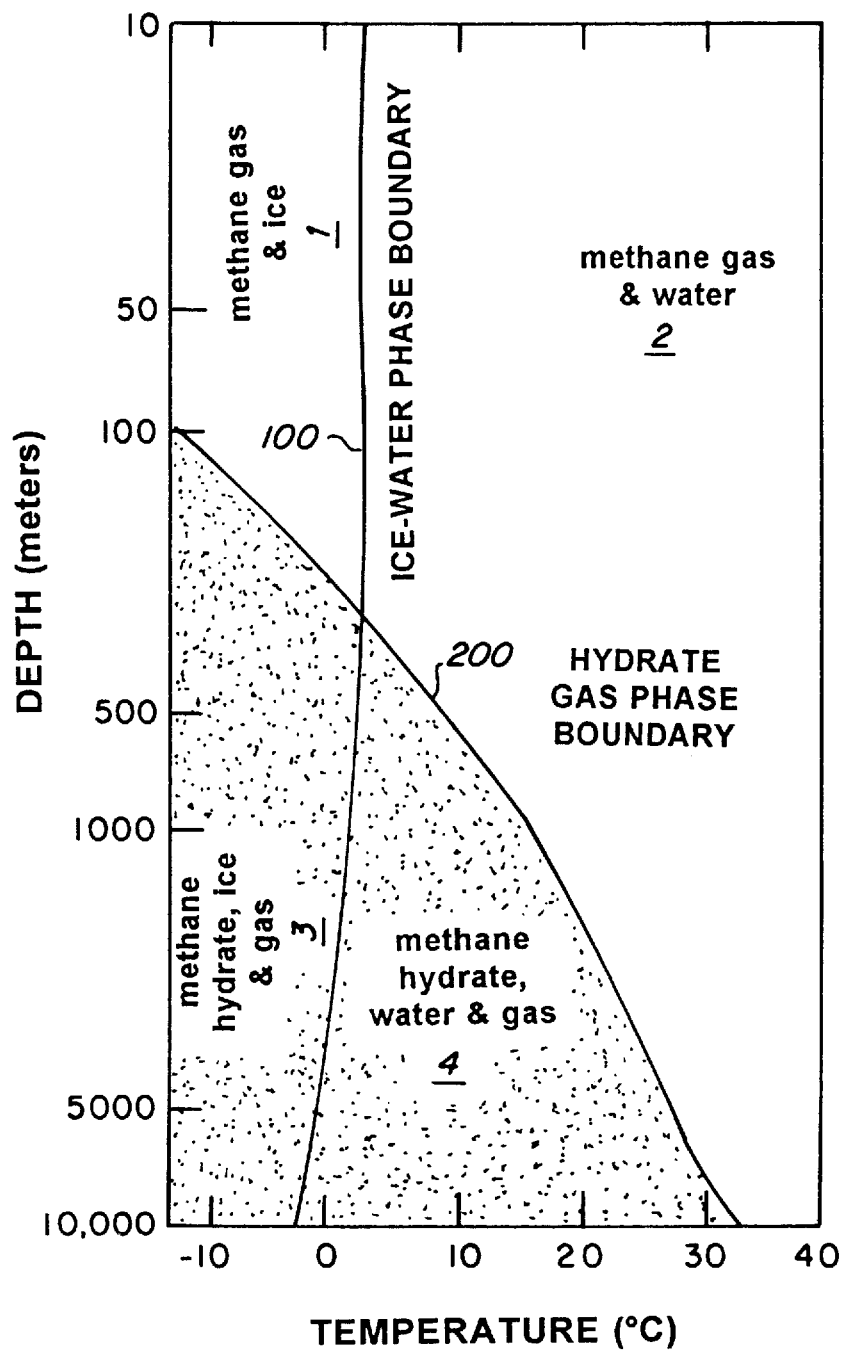
FIG. 2 is a phase diagram of water-ice-methane hydrate stability zone for fresh water.

FIG. 2 is a phase diagram which defines coexistence of methane gas, ice, water and methane hydrates. FIG. 2 indicates region one of methane gas and ice separated from region two of methane gas and seawater by a vertical ice-seawater phase boundary 100. Region three of methane hydrate, ice and methane gas is separated from region four of methane hydrate seawater and methane gas by a vertical ice-seawater phase boundary 100. Regions one and two are separated from regions three and four by the hydrate-methane gas phase boundary 200 which extends from about 100-meter depth to a depth of about 10,000 meters and below. It should be understood that methane hydrate can exist and can be formed at depths exceeding 10,000 meters. The phase diagram of FIG. 2 indicates that methane hydrate can remain stable at depths in the ocean exceeding about 100 meters and at temperatures below about 30° C.

Pursuant to the phase diagram of FIG. 2, one end of column 20 is located within region three or four. Since region four has in equilibrium methane hydrate, seawater and methane gas, the column should be located in region four or at a depth where temperature is above 0° C. so that there is no need to supply energy to melt ice. Natural pressure-temperature variation in the ocean allows methane pumped into seawater at depth to spontaneously form methane hydrate.

When the column is located in the sea, temperature of the seawater will be conducive to formation of methane hydrate as a natural function of pressure increase and temperature decrease with depth. If the water temperature is too high, the column must be disposed in regions one or two where methane hydrate is not stable and its formation is not naturally effected. If the water temperature is too low, methane hydrate formation can be effected but at a depth that may not be practical.

The column is typically located at about the boundary line of methane hydrate-methane gas so that the lower portion of the column is below the boundary line and the upper portion of the column is disposed above the boundary line. Such disposition of the column is done so that formation of methane hydrates is facilitated in the lower portion of the column and decomposition thereof is facilitated in the upper portion of the column. The method includes the step of feeding or injecting methane into column 20 through line 28 at point 30 where methane enters the column and instantaneously forms methane hydrate and bubbles filled with methane. Since mole ratio of methane gas to fresh water is assumed to be 1:6, based on the approximate mole ratio of methane gas to water in a methane hydrate, amount of methane fed into the column should be about ⅙ of recovered fresh water, on a mole basis. Size of the bubbles varies and it can be controlled by known means. Smaller bubbles are more desirable because they facilitate methane hydrate formation.

Methane hydrates and the bubbles are formed in the lower section 32 of column 20, which section 32 is also referred to herein as hydrate stability zone. A plurality of methane hydrates form on the periphery of the bubbles, and as the bubbles rise in the column due to their buoyancy, so do methane hydrates. Solid methane hydrate, like water ice, is naturally buoyant. Because the unhydrated gas, or the gas in the bubbles, expands with ascent, it will break the bubble shell and a new bubble shell or methane hydrate will form. This process of natural rupture and continued crystallization converts virtually all methane in the bubbles to methane hydrate.

Lower section 32 of column 20 is disposed above inlet point 30 for methane but below the phase boundary 36 so that formation of methane hydrates is facilitated. As the methane hydrates form, heat of fusion is given off and the heat is absorbed by surroundings giving the surrounding medium a tendency to rise. However, the insignificant amount of heat given off and the size of the column relative to the body of water that it is in make the impact of the tendency negligible. The lower end of the column in the hydrate stability zone may incorporate various fins to facilitate heat exchange to the cold seawater surrounding the column.

The methane hydrates are formed in section 32 of column 20 and may attach themselves to the bubbles which are also formed in section 32. Section 32 can be many meters long and diameter of column 20 must be large enough for the bubbles and methane hydrate to rise unobstructed by ice. Also, section 32 must be below the hydrate-gas phase boundary line 200 so that temperature and pressure of the seawater in section 32 is conducive to formation of methane hydrates. Seawater in section 32 is characterized by natural low temperature and high pressure.

Section 32 also has the effect of natural fractionation which is in evidence wherever heat transfer takes place. As methane hydrates and bubbles containing methane are formed in section 32 and heat of fusion is given off, natural fractionation on a small scale takes place whereby the heavier brine, formed when water is stripped from seawater, sinks after cooling through the bottom open end 34 of column 20 to mix with the body of seawater outside of the column. If desired, brine can be withdrawn from column 20 through line 35 located at the lower portion of the column above the open end 34.

As methane hydrates form as a shell on the bubbles, consuming gas, the gas and the hydrates rise. Gas is buoyant, as is methane hydrate, which has a density of about 0.9 g/cm$^3$ whereas density of seawater is about 1.1 g/cm$^3$. As methane hydrate and unhydrated bubbles pass from section 32 above boundary 36, they enter a zone where pressure is lower and methane hydrates clinging to the bubbles are no longer stable because they are in either region one or two above the boundary line 200. It is intended as part of an industrial process to convert virtually all methane gas in the bubbles to methane hydrate before it reaches the surface zone of warmer water where it will melt. Once methane hydrates pass above boundary 36, they enter section 38 which is at the upper portion of column 20. Since methane hydrates are unstable in section 38 due to the section disposition above the boundary line 200, depicted on the phase diagram, methane hydrate unit cells start to melt releasing water and methane gas. Since water (fresh or potable water) is lighter than seawater, it concentrates in the upper portion of column 20, such as in section 38 and above, and can be withdrawn through line 40 disposed above section 38. Decomposition or melting of methane hydrate unit cells is also accompanied by release of methane gas, which can be withdrawn although line 42 located at top of column 20 by passage through column top 22. Recovered methane is typically recycled to the column.

It should be understood that formation of bubbles is not a requisite of this separation process. Relative density of methane hydrate and seawater is such that methane hydrate is propelled upward within the column where it is formed.

If bubbles are formed, methane gas within the bubbles progressively dissipates as the bubbles move upward through the column and the bubbles diminish in size and number as methane gas is lost upon formation of methane hydrate. It is desired to make bubbles as small as possible since smaller bubbles have a more favorable surface area to volume ratio, and this can be done by passing methane gas through a section of frit in the bottom portion of the column. Frit has the ability to reduce the size of the bubbles by subdividing larger bubbles into smaller bubbles.

Methane hydrate can be decomposed in the colum by absorption of heat from the surrounding warm surface water to form hydrate slush. Alternatively, the hydrate slush can be sprayed with fresh water, the heat in which is sufficient to decompose the methane hydrate. In any case, fresh water and methane gas can be separately recovered because the solubility of methane in water is very low.

The hydrate melt section can also be many meters long and the longer it is, the more time is given to fully decompose the methane hydrates into water and methane gas using heat from surrounding water. Since a water hydrate unit cell is composed of 46 host molecules of water and 1–8 guest molecules of methane gas, decomposition of a methane hydrate cell yields 46 molecules of water and 1–8 molecules of methane gas. On a mole basis, it is estimated that one volume of water can accommodate 70 to over 160 volumes of methane gas. When decomposing one volume of methane hydrate, amount of water obtained is slightly less than one volume of methane hydrate and amount of gas is about 70 to over 160 volumes at STP.

Decomposition of the methane hydrates is accompanied by absorption of heat of dissociation which has the tendency to cool surrounding medium. Absorption of heat in section 38 is accompanied by a minor natural fractionation whereby the cooled medium has a tendency to sink and a warmer medium to take its place.

Figure 1B:
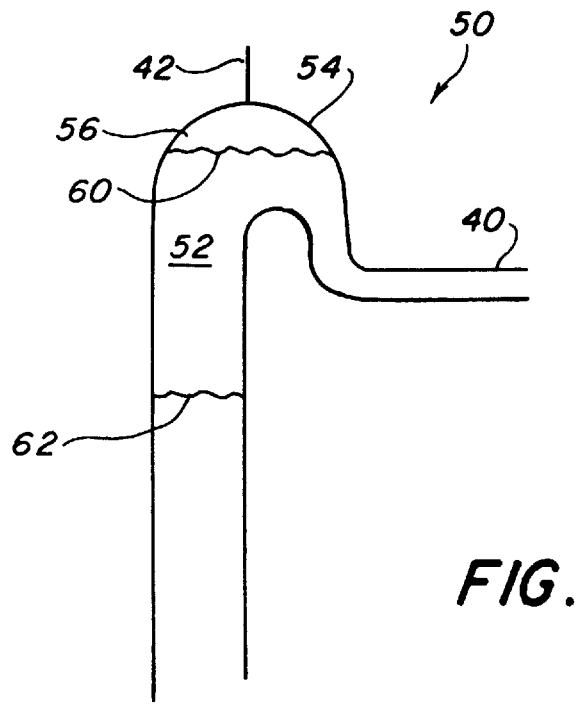
FIG. 1(b) is a schematic illustration of gas-water separator.
Figure 1A:
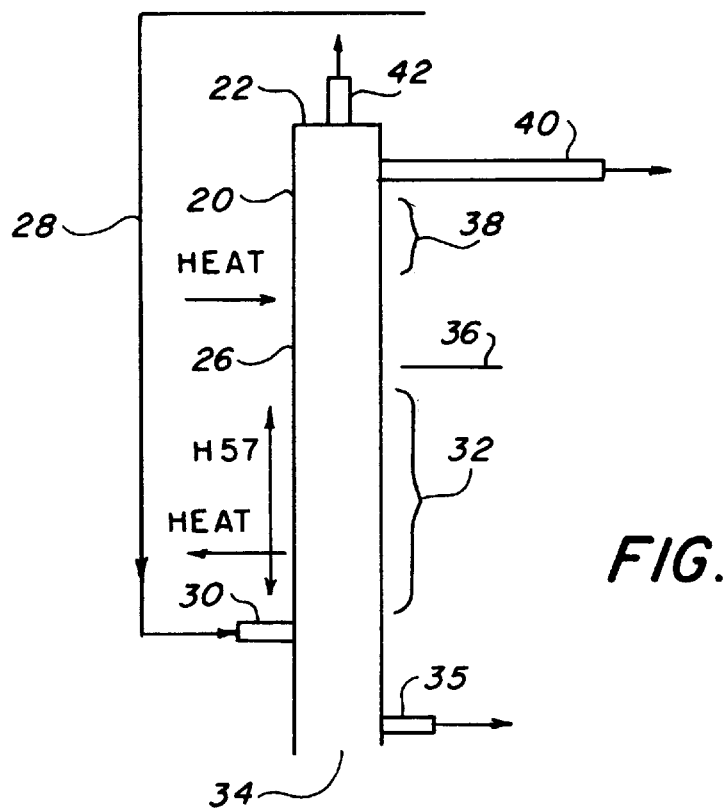
FIG. 1(a) is a schematic illustration of apparatus for making methane hydrate form seawater.

FIG. 1(*b*) illustrates gas-water separator 50 which can be provided at top of column 20 to separate fresh water 52 through line 40 from methane 54 which can be removed through line 42. Top of column 20 can be converted to separator 50 of FIG. 1(*b*) by providing at the top of column 20 gas head 56 within which methane 54 accumulates and a side line 40, shown in connection with the apparatus of FIG. 1(*a*). Feeding of methane gas through a conduit into column 20 is controlled to maintain fresh water level between levels 60 and 62 with line 40 therebetween and gas head 56 above level 60.

Methane hydrate unit cell is composed of a plurality of host water molecules and at least one guest molecule of methane. The water molecules form cages or sites within which are disposed methane molecules, with one methane molecule per cage, although some cages are empty and do not contain a methane molecule. Such materials are known as inclusion compounds. The water molecules and the methane molecules in a methane hydrate are held together by Van der Waal's forces. Due to the relative size of the cage interior and a methane molecule, only one guest methane molecule can be accommodated in a host water molecule cage.

More specifically, a unit cell of a methane hydrate is composed of 46 water molecules and 1 to 8 molecules of methane. Methane hydrate is a nonstochiometric crystalline material in that a variable amount of gas up to a maximum allowed by the crystal lattice structure can be contained within the guest unit cell. The number of methane molecules in the hydrate unit cell increases with lower temperature and higher pressure, which means that more methane molecules will be present in methane hydrates formed at greater depths in an ocean, assuming sufficient methane to occupy lattice sites. Typically, methane hydrates are undersaturated in that some of the guest sites are not occupied. A fully saturated methane hydrate, however contains more gas and has a higher energy density, in btu/liter, than liquified methane because the methane sites in the crystal lattice are closer together than methane molecules in a liquid.

Methane hydrate is a solid, waxy crystalline material and has the following physical properties:

heat of fusion/dissociation 54 kJ/mol at 273K heat capacity 257 kJ/mol heat of solution 13.26 kJ/mol coefficient of expansion $2/7$ density 0.9 g/cm$^3$ The desalination process has been described in connection with formation of methane hydrates in seawater. It should be understood that methane hydrates can be formed in any body of water as long as temperature and pressure are such that they define a hydrate stability zone; i.e., zones 3 and 4 on the phase diagram of FIG. 2. This process can be used in a body of polluted water to produced purified fresh water since upon decomposition, a methane hydrate releases methane gas and pure water. So the term "purification" and derivatives thereof includes desalination. Furthermore, the term "polluted water" includes saline water.

It was already disclosed that methane hydrate forms naturally and instantaneously at appropriate temperature and pressure. For purposes herein, the term "instantaneous" means a period of time typically less than about 5 seconds, more typically less than a couple of seconds, such as 0.5–2 seconds.

Rate of desalination depends on many parameters, especially size of column, injection rate of methane, salinity or impurity of water, and depth at which the column is located. However, for a column pipe 2 meters in diameter, 100 meters in length submerged in a body of seawater at a depth of 500 meters and with a methane feed rate of 12 m$^3$/min, rate of desalination or production of fresh or potable water is about 310,000 m$^3$ per 24 hour day.

One of the products produced by the process described herein is fresh, potable water suitable for drinking by humans. Solubility of methane in fresh water is at a ppm level which is not harmful to humans. Presence of methane molecules in water can be detected at ppm level. This is one way that the product fresh water can be tagged with this process since it is effective with clathrates wherein the hydrate contains other molecules than methane, assuming at least some solubility of the other molecules in the water.

While presently preferred embodiments have been shown of the invention disclosed herein, persons skilled in this art will readily appreciate that various additional changes and modifications can be made without departing from the spirit of the invention as defined and differentiated by the following claims.

What is claimed is:

1. A method for purifying polluted water comprising the steps of (a) feeding methane gas into a lower zone of a body of polluted water of sufficient temperature and pressure to form methane hydrate which rises after its formation to a higher zone where it decomposes into methane and purified water, and (b) recovering the purified water.

2. The method of claim 1 wherein the lower zone is located below the boundary line defined by a phase diagram which separates regions where methane gas coexists with the polluted water or ice from regions where methane hydrate coexists with methane gas and the polluted water or ice.

3. The method of claim 2 wherein the methane hydrate is formed instantaneously in the lower zone.

4. The method of claim 3 wherein in the lower zone the temperature is about −20° to about +30° C. and pressure therein is about 10 to about 1,000 atmospheres and in the higher zone temperature is above about −20° C. but below its boiling point and pressure therein is about 0 to about 1,000 atmospheres.

5. The method of claim 3 wherein in the lower zone temperature is about 0° to about +30° C. and pressure therein is about 50 to about 1,000 atmospheres and in the higher zone temperature is above 0° C. but below its boiling point and pressure therein is about 0 to about 1,000 atmospheres.

6. The method of claim 4 wherein methane hydrate coexists with water and methane gas.

7. The method of claim 6 wherein the lower zone is disposed in the body of polluted water at a depth exceeding 100 meters and down to 10,000 meters.

8. The method of claim 7 wherein a unit cell of the methane hydrate is composed of host water molecules and at least one methane guest molecule.

9. The method of claim 8 wherein at least some methane hydrate attaches to bubbles of methane gas and is carried thereon upwards.

10. Product made by the method of claim 1.

11. A method for desalinating saline water to potable water comprising the steps of
    (a) feeding methane gas into a lower zone of a body of saline water that is at a temperature and under pressure sufficient to form methane hydrate which rises after its formation to a higher zone where it decomposes into methane and potable water, and
    (b) recovering the potable water.

12. The method of claim 11 wherein the lower zone is located below the boundary line defined by a phase diagram which separates regions where methane gas coexists with the polluted water or ice from regions where methane hydrate coexists with methane gas and the the polluted water or ice.

13. The method of claim 12 wherein the methane hydrate is formed instantaneously in the lower zone.

14. The method of claim 13 wherein in the lower zone the temperature is about −20° to about +30° C. and pressure therein is about 10 to about 1,000 atmospheres and in the higher zone the temperature is above about −20° C. but below its boiling point and pressure therein is about 0 to about 1,000 atmospheres.

15. The method of claim 13 wherein in the lower zone the temperature is about 0° to about +30° C. and pressure therein is about 50 to about 1,000 atmospheres and in the higher zone the temperature is above about 0° C. but below its boiling point and pressure therein is about 0 to about 1,000 atmospheres.

16. The method of claim 15 wherein the lower and the higher zones are disposed in a pipe with the lower disposed within the lower portion of the pipe and the higher zone is disposed within the upper portion of the pipe, and wherein the lower zone is disposed in the body of saline water where methane hydrate coexists with water and methane gas.

17. The method of claim 16 wherein the lower zone is disposed in the body of saline water at a depth exceeding 100 meters and down to 10,000 meters and below.

18. The method of claim 17 wherein at least some methane hydrate attaches to bubbles of methane gas and is carried thereon upwards.

19. The method of claim 18 including the step of recycling methane obtained from decomposition of methane hydrate.

20. Product made by the method of claim 11.

* * * * *